(12) United States Patent
Molnar et al.

(10) Patent No.: US 11,547,235 B2
(45) Date of Patent: Jan. 10, 2023

(54) BEVERAGE DRIPPER ASSEMBLIES AND METHODS

(71) Applicant: SONUS Engineered Solutions, Warren, MI (US)

(72) Inventors: Pal Molnar, Grosse Pointe Woods, MI (US); Tim Droege, Macomb, MI (US)

(73) Assignee: Sonus Engineered Solutions, Warren, MI (US)

( * ) Notice: Subject to any disclaimer, the term of this patent is extended or adjusted under 35 U.S.C. 154(b) by 486 days.

(21) Appl. No.: 16/808,679

(22) Filed: Mar. 4, 2020

(65) Prior Publication Data

US 2020/0288900 A1   Sep. 17, 2020

Related U.S. Application Data

(60) Provisional application No. 62/817,128, filed on Mar. 12, 2019.

(51) Int. Cl.
*A47J 31/02* (2006.01)
*A47J 31/44* (2006.01)
*A47J 31/00* (2006.01)

(52) U.S. Cl.
CPC ............ *A47J 31/02* (2013.01); *A47J 31/005* (2013.01); *A47J 31/4482* (2013.01)

(58) Field of Classification Search
CPC ....... A47J 31/02; A47J 31/005; A47J 31/4482
See application file for complete search history.

(56) References Cited

U.S. PATENT DOCUMENTS

| | | |
|---|---|---|
| 3,334,574 A | 8/1967 | Douglas |
| 4,167,136 A | 9/1979 | Chupurdy |
| 4,221,670 A | 9/1980 | Ziemek |
| D274,115 S | 6/1984 | Davin et al. |
| D521,329 S | 5/2006 | Bodum |
| D564,832 S | 3/2008 | Bodum |
| D635,398 S | 4/2011 | Watabe |
| 7,926,414 B1 | 4/2011 | Wolcott et al. |
| 9,439,531 B1 | 9/2016 | Bomt |
| D778,668 S | 2/2017 | Hojo |
| D793,156 S | 8/2017 | Hojo |
| D796,889 S | 9/2017 | Laskowski et al. |
| D797,501 S | 9/2017 | Thurlow |
| 10,051,987 B2 | 8/2018 | Bebo |
| 2009/0178572 A1 | 7/2009 | Wolcott et al. |
| 2015/0157163 A1* | 6/2015 | Lin .......... A47J 31/02 99/322 |
| 2019/0191914 A1* | 6/2019 | Schillheim .......... A47J 31/0626 |

FOREIGN PATENT DOCUMENTS

| | | |
|---|---|---|
| DE | 19620381 A1 | 1/1997 |
| JP | 10286180 A | 10/1998 |

* cited by examiner

*Primary Examiner* — Omar Flores Sanchez
(74) *Attorney, Agent, or Firm* — Carlson, Gaskey & Olds, P.C.

(57) ABSTRACT

A beverage dripper includes a base portion, including a first tier having a first outer diameter and a second tier having a second outer diameter less than the first outer diameter. A content portion extends from the base portion. The content portion includes an inner surface, and a plurality of ribs protrude from the inner surface.

18 Claims, 6 Drawing Sheets

BEVERAGE DRIPPER ASSEMBLIES AND METHODS

CROSS-REFERENCE TO RELATED APPLICATION

This application claims priority to U.S. Provisional Application No. 62/817,128, which was filed on Mar. 12, 2019.

BACKGROUND

Beverages, such as coffee or tea in some examples, may be made by flowing water or other liquids across grounds in a filter and allowing the water to drip into a vessel.

SUMMARY

A beverage dripper, according to an example of this disclosure, includes a base portion, including a first tier having a first outer diameter and a second tier having a second outer diameter less than the first outer diameter. A content portion extends from the base portion. The content portion includes an inner surface, and a plurality of ribs protrude from the inner surface.

In a further example of the foregoing, the content portion includes a circular rim circumscribing an opening at an upper end of the content portion. The inner surface converges from the rim to an oval surface in a tapered manner.

In a further example of any of the foregoing, the oval surface is parallel with the rim.

In a further example of any of the foregoing, a second plurality of ribs extend from the oval surface.

In a further example of any of the foregoing, the base portion includes a tab extending from an extension portion above the first tier and the second tier.

In a further example of any of the foregoing, the base portion and the content portion are monolithic.

In a further example of any of the foregoing, the base portion and the content portion are made of an injection molded plastic.

In a further example of any of the foregoing, first and second opposed partially cylindrical closeout walls extend from the base portion to the content portion.

In a further example of any of the foregoing, the inner surface includes first and second conical surfaces.

In a further example of any of the foregoing, the first tier is configured to seal with a 30 oz beverage container, and the second tier is configured to seal with a 20 oz beverage container.

In a further example of any of the foregoing, the dripper includes first and second ring seals. The first tier provides a groove extending inward from the first outer diameter and that receives the first ring seal. The second tier provides a second groove extending inward from the second outer diameter and that receives the second ring seal.

A beverage dripper, according to an example of this disclosure, includes a base portion, including a first tier having a first outer diameter, a second tier having a second outer diameter less than the first outer diameter, and a tab extending from an extension portion above the first tier and the second tier. A content portion extends from the base portion. The content portion includes an inner surface, and a first plurality of ribs protrude from the inner surface. A circular rim circumscribes an opening at an upper end. An oval surface is parallel with the rim, and a second plurality of ribs are provided on the oval surface. The inner surface converges from the rim to the oval surface in a tapered manner First and second partially cylindrical closeout walls extend from the base portion to the content portion. The base portion, the content portion, and the first and second closeout walls are formed by a monolithic injection molded plastic.

In a further example of the foregoing, the first plurality ribs each extend in a direction from the outer rim toward the oval surface.

In a further example of any of the foregoing, the oval surface provides an opening to allow liquid to pass through.

In a further example of any of the foregoing, the second plurality of ribs each extend in a direction outward from the opening.

In a further example of any of the foregoing, the first closeout wall meets a sloped outer surface of the content portion at a curved interface.

In a further example of any of the foregoing, the second closeout wall meets a second sloped outer surface of the content portion at a second curved interface.

In a further example of any of the foregoing, the dripper includes first and second ring seals. The first tier provides a groove extending inward from the first outer diameter and that receives the first ring seal. The second tier provides a second groove extending inward from the second outer diameter and that receives the second ring seal.

In a further example of any of the foregoing, one or more closeout walls may extend from the content portion to the base portion. In a further example of any of the foregoing, the closeout wall may include one or more through openings.

A method of manufacturing a beverage dripper, according to an example of this disclosure, includes injecting material into a mold to create a base portion and a content portion. The base portion includes a first tier having a first diameter and a second tier having a second diameter less than the first diameter. The content portion extends from the base portion, and the content portion includes an inner surface and a plurality of ribs protruding from the inner surface.

In a further example of the foregoing, the method includes providing a first rubber seal around the first tier, and providing a second rubber seal around the second tier.

These and other features may be best understood from the following specification and drawings, the following of which is a brief description.

DETAILED DESCRIPTION

This disclosure relates generally to assemblies and methods for a beverage dripper. In some examples, beverage drippers may be used to make coffee, tea, or other similar beverages. Although many illustrative examples disclosed relate to coffee drippers, examples may apply to other beverages as well.

Figure 1:
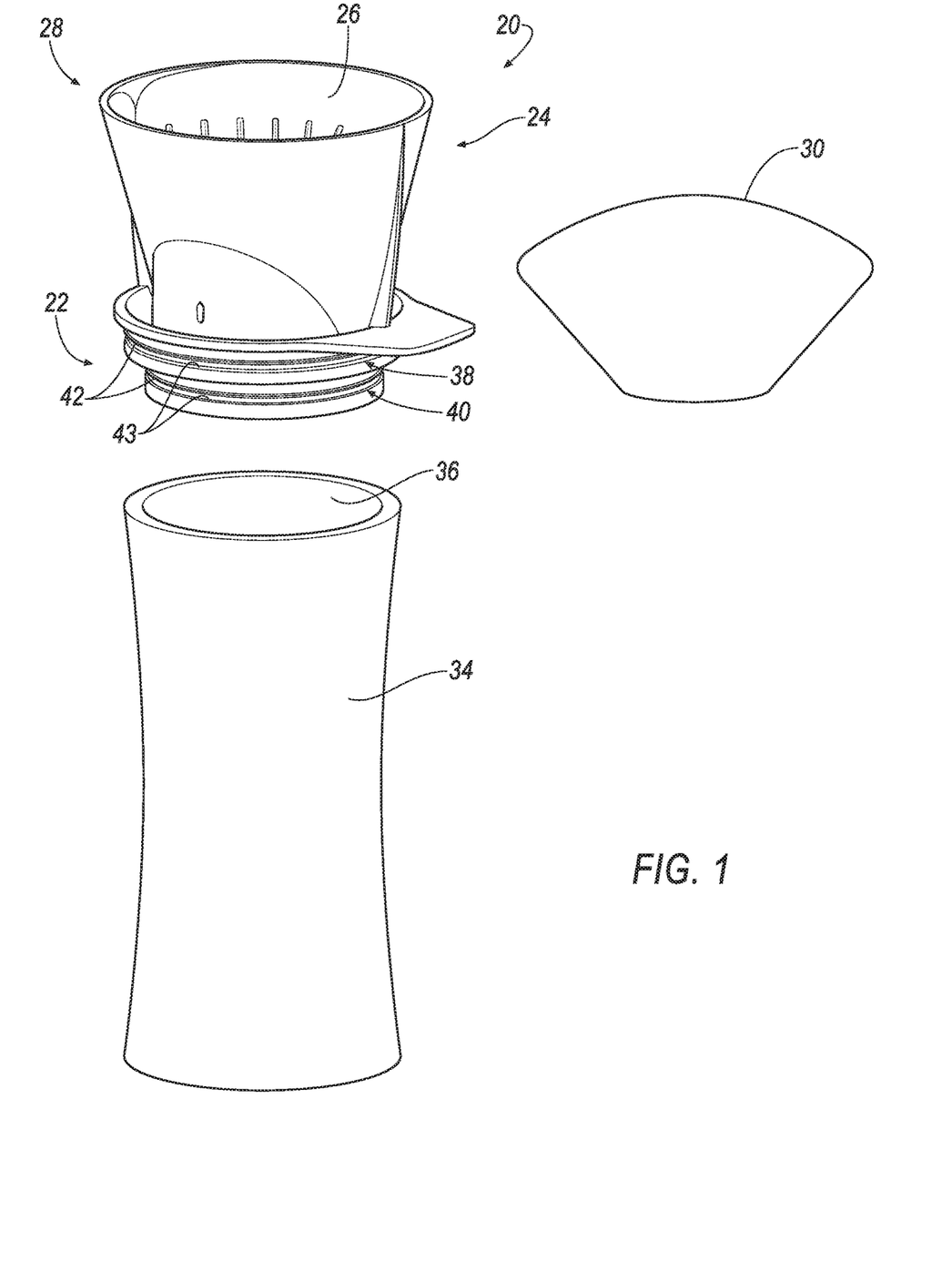
FIG. 1 illustrates an example beverage dripper.

FIG. 1 illustrates an example beverage dripper 20. The dripper 20 includes a base portion 22 and a content portion 24 extending upward from the base portion 22. The content portion 24 includes an opening 26 at the upper end 28 and may receive a filter 30, such as a paper coffee filter that holds coffee grounds or beans in some examples. The base portion 22 is at a lower end 32 of the dripper 20 opposite the upper end 28 and may be received in a vessel 34 at an opening 36 of the vessel 34. Terms such as "upper" and "lower" are used with respect to the normal orientation of the dripper 20 when received in the vessel 34. In some examples, the vessel 34 is a beverage travel mug, such as a travel mug for coffee or tea.

In some examples, the base portion 22 may include a first tier portion 38 and a second tier portion 40. In some examples, as shown, the first tier portion 38 has a greater outer diameter than the second tier portion 40, such that the dripper 20 may be received in at least two differently sized vessels 34 and maintain a sealed engagement in each. In some examples, the first tier portion 38 is designed to engage a 30 oz. vessel in a sealed manner, and the second tier portion 40 is designed to engage a 20 oz. vessel in a sealed manner Other sizes and configurations, such as those having more or fewer than two tier portions, are contemplated.

The base portion 22 may include one or more ring seals 42 to maintain the sealing engagement between the dripper 20 and the vessel 34. In some examples, as shown, the first tier portion 38 and the second tier portion 40 each include at least one ring seal 42 on their respective outer diameters. In some examples, the ring seals 42 are made of a rubber material. In some examples, the base portion 22 may include one or more grooves for receiving the ring seals 42. In some examples, the first tier portion 38 includes a groove 43 extending radially inward from its outer diameter, and the second tier portion 40 includes a groove 43 extending radially inward from its outer diameter.

In some examples, the base portion 22 and the content portion 24 form one monolithic plastic piece, but the ring seals 42 are separate components. In some examples, the dripper 20 is manufactured by injection molding. Other configurations are contemplated.

As described further below, during use, liquid is released through the content portion 24 and base portion 22 into the vessel 34 below. In some examples, hot water is poured over coffee or tea in the filter 30 received in the content portion 24, allowing liquid coffee or tea to drip through the dripper 20 and into the vessel 34. The content portion 24 and filter 30 may be open at the upper end to allow for the input of the water or other liquids.

Figure 2:
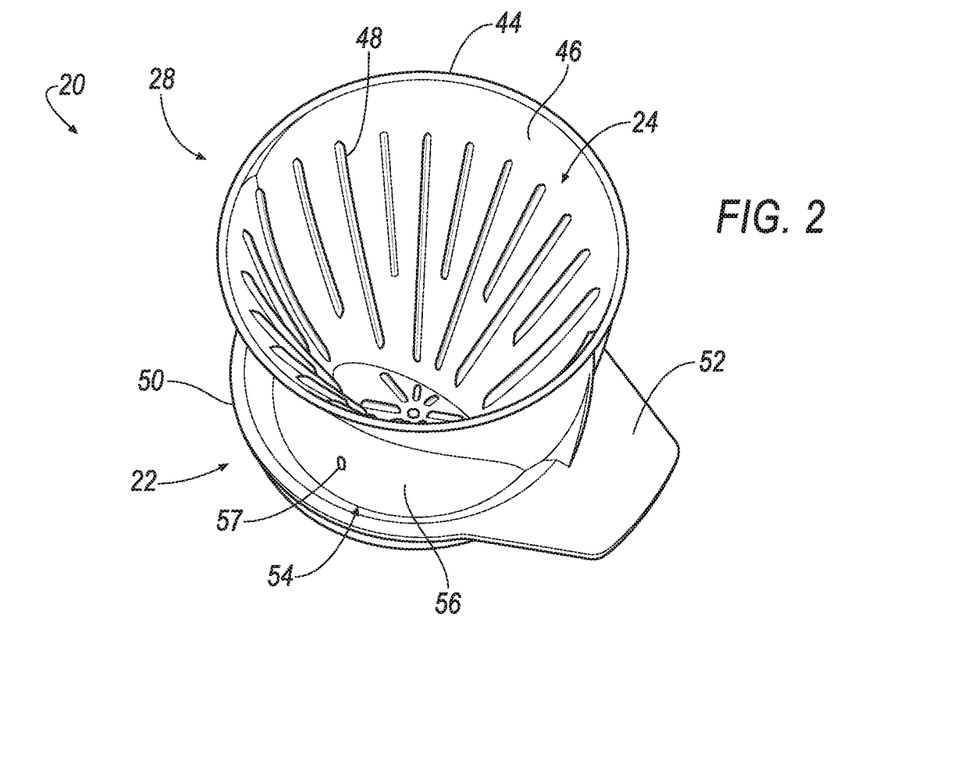
FIG. 2 illustrates a second perspective view of the beverage dripper of FIG. 1.

FIG. 2 illustrates a second perspective view of the beverage tumbler dripper 20 of FIG. 1. In some examples, as shown, the outer rim 44 at the upper end 28 of the content portion 24 is circular. The content portion 24 includes an inner surface 46 and a number of spaced apart ribs 48 protruding from the inner surface 46. The ribs 48 may create air pockets between the filter 30 and the inner surface 46 and between adjacent ribs 48. The ribs 48 may prevent a vacuum from being created in the content portion 24 during use with a filter 30 (see FIG. 1).

The base portion 22 includes an outer extension 50 above the tier portions 38,40 (not shown) and a tab 52 that extends from the outer extension 50. The tab 52 may be used for attachment to and removal from a vessel 34 (see FIG. 1). In some examples, the tab 52 may extend about ¾ inch to 1 inch from the first tier 38 to provide surface area for user handling. Other lengths and orientations are contemplated.

In some examples, as shown, a recess 54 is provided radially inward of the extension 50. One or more closeout walls 56 may extend from the content portion 24 to the base portion 22. In some examples, as shown, the closeout wall 56 may include one or more through openings 57 for ventilation. In the illustrative example, two opposed through openings 57 are included, but more or fewer through openings 57 may be utilized in some examples. The closeout walls 56 connect the base portion 22 and the content portion 24, as well as control the speed of the beverage flow (dripping) by sealing the air in the vessel, and allowing the air to flow out of the openings 57.

Figure 3:
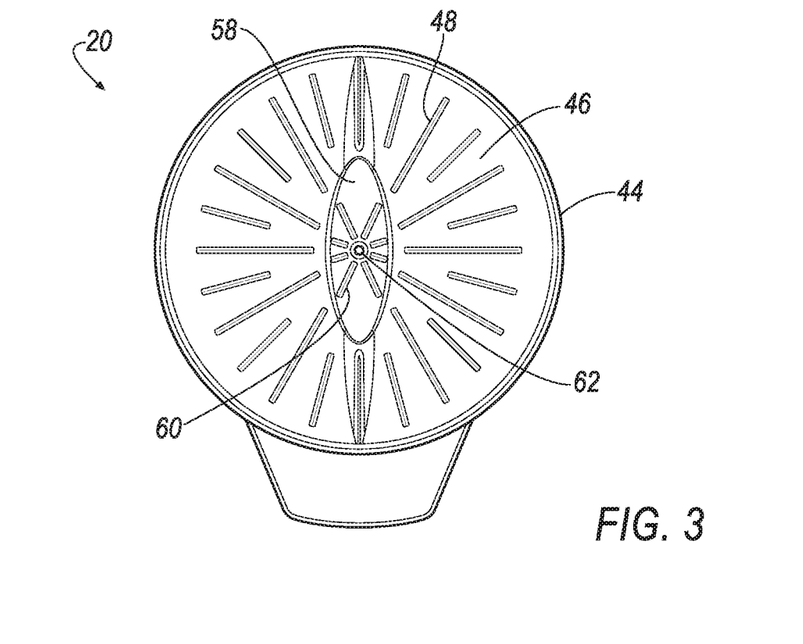
FIG. 3 illustrates a top view of the example dripper of FIGS. 1-2.

FIG. 3 illustrates a top view of the example dripper 20. The example outer rim 44 is circular, and the inner surface 46 converges from the rim 44 to an oval shaped surface 58 parallel to the outer rim 44. In some examples, the inner surface 46 is provided by one or more conical surfaces. In some examples, the inner surface 46 is provided by two conical surfaces.

In some examples, as shown, the lengths of the ribs 48 vary between adjacent ribs in an alternating fashion between longer and shorter lengths. The surface 58 may also include one or more ribs 60, as shown. The ribs 60 may create air pockets between the filter 30 and the surface 58 and between adjacent ribs 60. The ribs 60 may prevent a vacuum from being created in the content portion 24 during use with a filter 30 (see FIG. 1). The surface 58 also provides an opening 62 to allow liquid to flow into the vessel 34 (not shown in FIG. 3) below. In some examples, as shown, the ribs 48 may extend in a direction from the outer rim 44 toward the surface 58. In some examples, as shown, the ribs 60 may extend in a direction outward from the opening 62.

Figure 4:
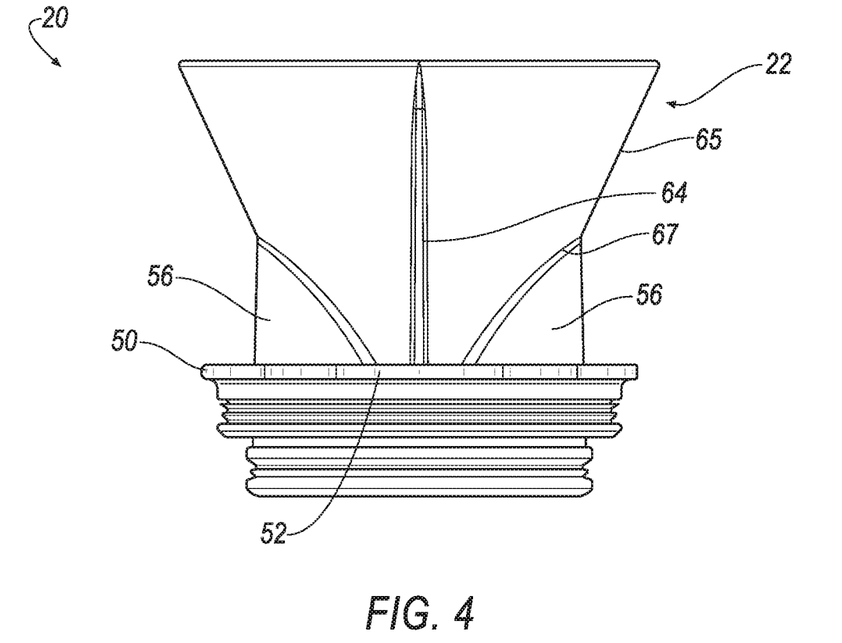
FIG. 4 illustrates a rear view of the example dripper of FIGS. 1-3.

FIG. 4 illustrates a rear view of the example dripper 20. In some examples, as shown, the tab 52 is in plane with the extension 50. A ridge 64 may be provided in the content portion 24. In some examples, as shown, the dripper 20 may include two opposed closeout walls 56 that are partially cylindrical and meet the sloped surface 65 of the content portion 24 at a curved interface 67.

Figure 5:
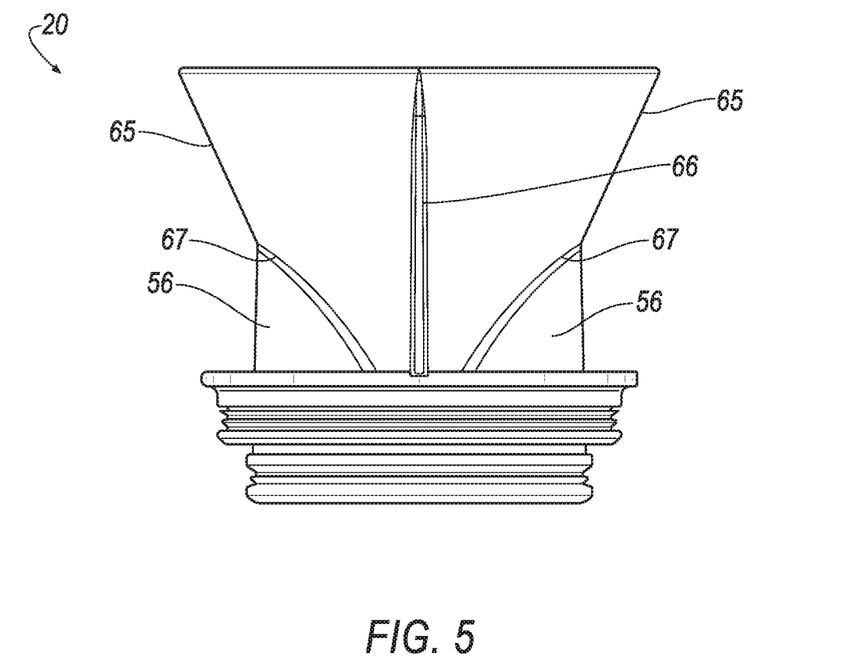
FIG. 5 illustrates a front view of the example dripper of FIGS. 1-4.
Figure 6:
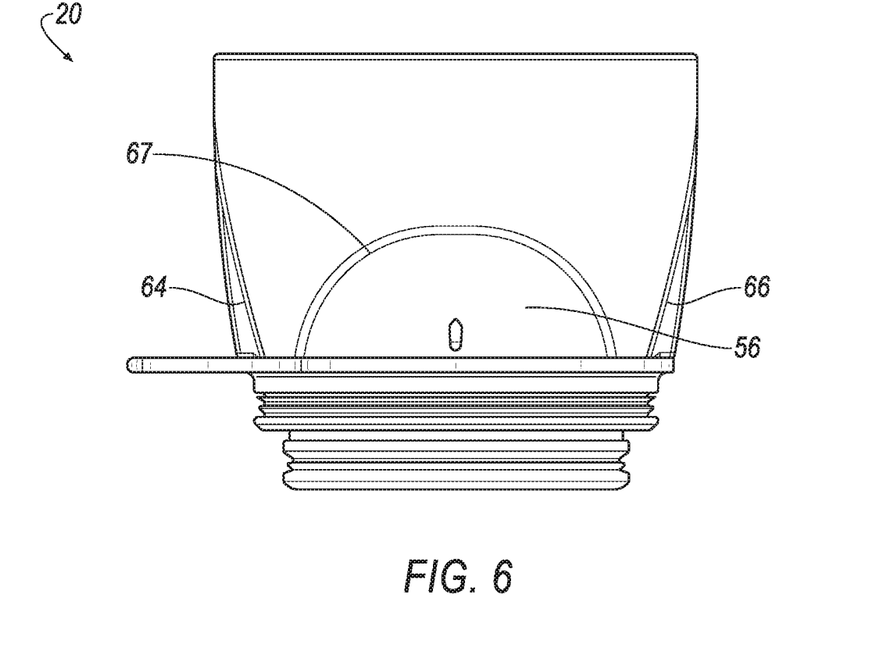
FIG. 6 illustrates a first side view of the example dripper of FIGS. 1-5.
Figure 7:
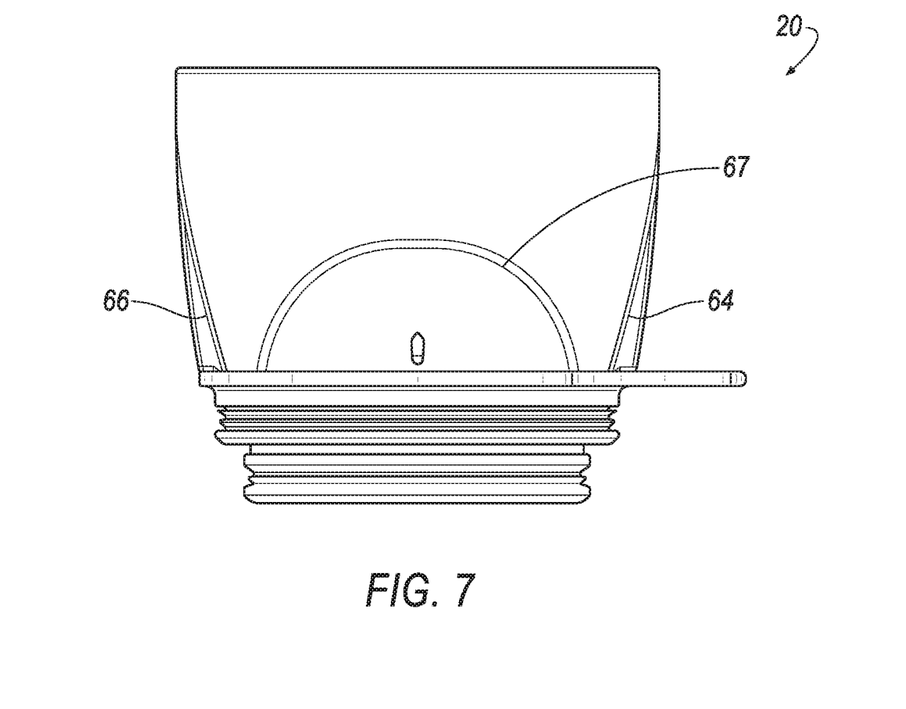
FIG. 7 illustrates a second side view of the example dripper opposite the first side view of FIG. 6.

FIG. 5 illustrates a front view of the example dripper 20. FIG. 6 illustrates a first side view of the example dripper 20. FIG. 7 illustrates a second side view of the example dripper 20 opposite the first side view of FIG. 6. A ridge 66 is provided opposite the ridge 64. The opposed closeout walls 56 are partially cylindrical and meet the sloped surface 65 of the content portion 24 at respective curved interfaces 67. In some examples, the ridges 64, 66 add support to the closeout walls 56. In some exmaples, the ridges 64, 66 aid in manufacturing, by sealing off the mold between the left and right lifters 100 (see FIG. 10).

Figure 8:
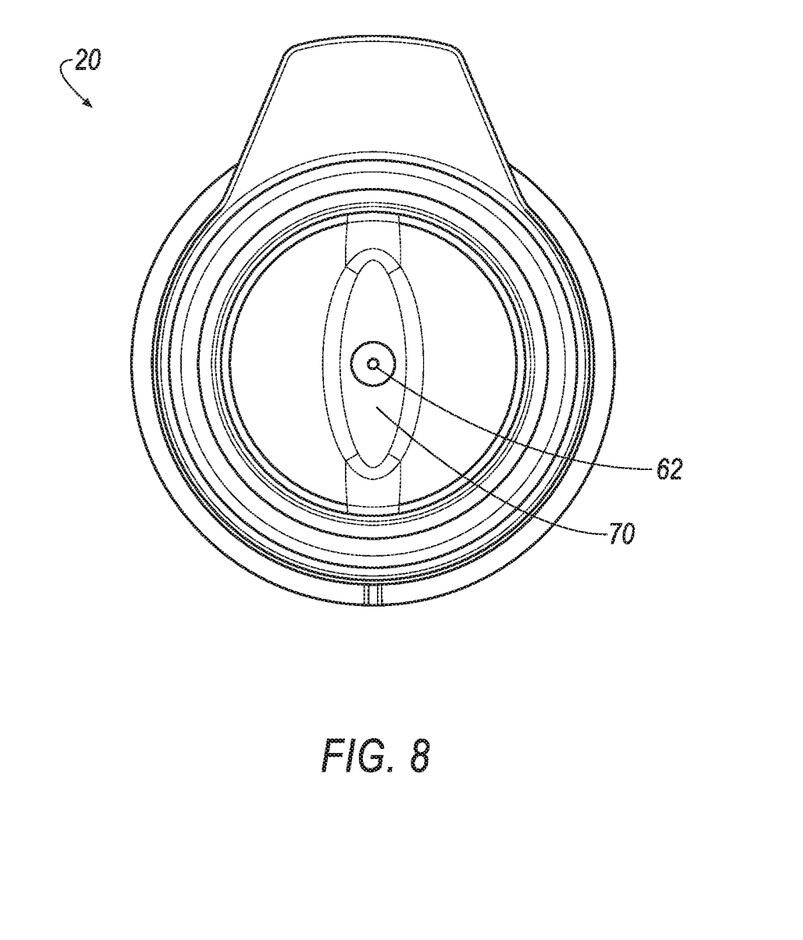
FIG. 8 illustrates a bottom view of the example dripper.

FIG. 8 illustrates a bottom view of the example dripper 20. The opening extends through to an undersurface 70 of the dripper to allow liquid to drip from the content portion (not shown) to a vessel (also not shown) under the dripper.

Figure 9:
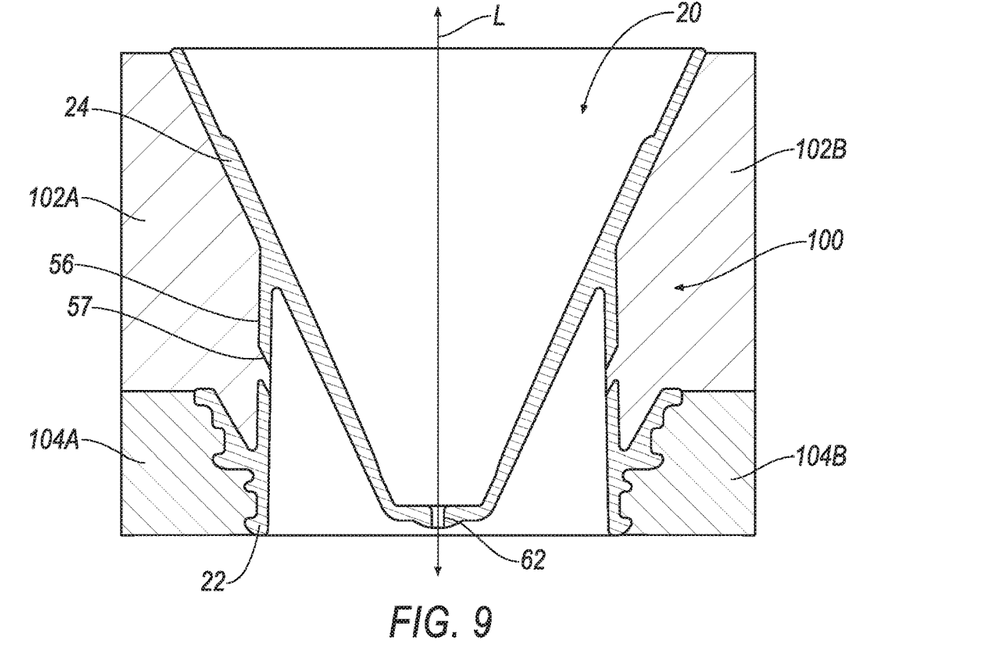
FIG. 9 illustrates the example dripper in a mold-closed position in an injection mold.

FIG. 9 illustrates the example dripper 20 in a mold-closed position in an injection mold tool 100. In some examples, the tool 100 does not provide the ring seals 42, which may be added after the dripper 20 is injection molded. In some examples, as shown, the tool forming the beverage dripper 20 as a monolithic component comprises a mold cavity, removed from it in a direction called line of draw L. The mold cavity forms the inside and bottom surfaces of the base portion 22, as well as the inside surface of the closeout wall 56, the bottom surface of the content portion 24, and the bottom surface of a tab (not shown).

The tool 100 also includes a mold core, removed in opposing direction of the line of draw L. The mold core forms inside surfaces and the top surface of the content portion 24, the top surface of the tab (not shown), as well as one or more openings 62. The tool 100 also includes two or more lateral mold actions, removed from the beverage dripper 20 essentially normal to the line of draw L; these form the outside surfaces of the base portion 22. The tool 100 also includes two or more juxtaposing slanted mold actions, removed from the beverage dripper in an acute angle to the line of draw. These form the outside surfaces of the content portion 24 and of the closeout wall 56, the top surfaces of the base portion 22, two or more ridges (not shown), as well as two or more ventilation openings 57 on the closeout wall.

The tool 100 includes a first set of opposed blocks 102A and 102B and a second set of opposed blocks 104A and 104B.

Figure 10:
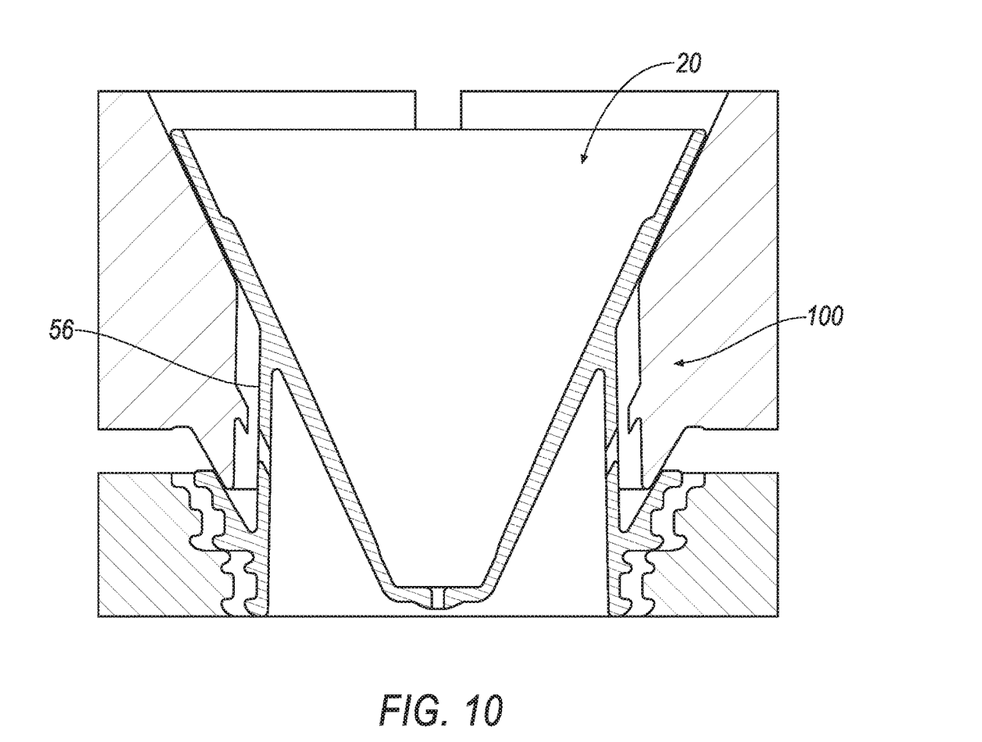
FIG. 10 illustrates the example dripper 20 in a mold-open position in an injection mold.

FIG. 10 illustrates the example dripper 20 in a mold-open position in an injection mold 100.

An example method of manufacturing a beverage dripper, in accordance with one or more of the examples of this disclosure, may include injecting material into a mold to create a base portion and a content portion.

An example method of making a beverage, in accordance with one or more of the examples of this disclosure, may include positioning a dripper on a vessel, positioning a filter within a content portion of the dripper, and pouring liquid through the filter, such that the liquid drips into the vessel.

In some examples, the example dripper 20 provides a monolithic, injection molded plastic component that may be used to drip beverages into vessels of multiple sizes. The dripper 20 is compatible with paper filters, which can be disposed of after beverage preparation for convenient cleanup.

The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples. These and other examples are within the scope of the following claims.

What is claimed is:

1. A beverage dripper, comprising:
   a base portion having a first tier having a first outer diameter and a second tier having a second outer diameter less than the first outer diameter; and
   a content portion extending from the base portion, wherein the content portion includes an inner surface and a plurality of ribs protruding from the inner surface, wherein the inner surface includes first and second conical surfaces.

2. A beverage dripper, comprising:
   a base portion having a first tier having a first outer diameter and a second tier having a second outer diameter less than the first outer diameter; and
   a content portion extending from the base portion, wherein the content portion includes an inner surface, a plurality of ribs protruding from the inner surface and a circular rim circumscribing an opening at an upper end of the content portion, and the inner surface converges from the rim to an oval surface in a tapered manner.

3. The dripper as recited in claim 2, wherein the oval surface is parallel with the rim.

4. The dripper as recited in claim 2, wherein a second plurality of ribs extend from the oval surface.

5. A beverage dripper, comprising:
   a base portion having a first tier having a first outer diameter, a second tier having a second outer diameter less than the first outer diameter, and a tab extending from an extension portion above the first tier and the second tier; and
   a content portion extending from the base portion, wherein the content portion includes an inner surface and a plurality of ribs protruding from the inner surface.

6. The dripper as recited in claim 1, wherein the base portion and the content portion are monolithic.

7. The dripper as recited in claim 6, wherein the base portion and the content portion are made of an injection molded plastic.

8. The dripper as recited in claim 1, comprising:
   first and second opposed partially cylindrical closeout walls extending from the base portion to the content portion.

9. A beverage dripper, comprising:
   a base portion having a first tier having a first outer diameter and a second tier having a second outer diameter less than the first outer diameter, wherein the first tier is configured to seal with a 30 oz beverage container, and the second tier is configured to seal with a 20 oz beverage container; and
   a content portion extending from the base portion, wherein the content portion includes an inner surface and a plurality of ribs protruding from the inner surface.

10. A beverage dripper, comprising:
    a base portion have a first tier having a first outer diameter and a second tier having a second outer diameter less than the first outer diameter;
    a content portion extending from the base portion, wherein the content portion includes an inner surface and a plurality of ribs protruding from the inner surface; and
    first and second ring seals, wherein the first tier provides a groove extending inward from the first outer diameter and that receives the first ring seal, and the second tier provides a second groove extending inward from the second outer diameter and that receives the second ring seal.

11. A beverage dripper, comprising:
    a base portion having a first tier having a first outer diameter, a second tier having a second outer diameter less than the first outer diameter, and a tab extending from an extension portion above the first tier and the second tier;
    a content portion extending from the base portion, wherein the content portion includes an inner surface, a first plurality of ribs protruding from the inner surface, a circular rim circumscribing an opening at an upper end, an oval surface parallel with the rim, and a second plurality of ribs provided on the oval surface, wherein the inner surface converges from the rim to the oval surface in a tapered manner; and
    first and second partially cylindrical closeout walls extending from the base portion to the content portion;

wherein the base portion, the content portion, and the first and second closeout walls are formed by a monolithic injection molded plastic.

12. The dripper as recited in claim 11, wherein the first plurality ribs each extend in a direction from the outer rim toward the oval surface.

13. The dripper as recited in claim 11, wherein the oval surface provides an opening to allow liquid to pass through.

14. The dripper as recited in claim 13, wherein the second plurality of ribs each extend in a direction outward from the opening.

15. The dripper as recited in claim 11, wherein the first closeout wall meets a sloped outer surface of the content portion at a curved interface.

16. The dripper as recited in claim 15, wherein the second closeout wall meets a second sloped outer surface of the content portion at a second curved interface.

17. The dripper as recited in claim 11, comprising first and second ring seals, wherein the first tier provides a groove extending inward from the first outer diameter and that receives the first ring seal, and the second tier provides a second groove extending inward from the second outer diameter and that receives the second ring seal.

18. A method of manufacturing a beverage dripper, the method comprising:
   injecting material into a mold to create a base portion and a content portion, wherein the base portion includes a first tier having a first diameter and a second tier having a second diameter less than the first diameter, the content portion extends from the base portion, and the content portion includes an inner surface and a plurality of ribs protruding from the inner surface;
   providing a first rubber seal around the first tier; and
   providing a second rubber seal around the second tier.

* * * * *